United States Patent
Papon et al.

(10) Patent No.: US 6,355,760 B1
(45) Date of Patent: Mar. 12, 2002

(54) POLYURETHANE ADHESIVE WITH HIGH SHEARING RESISTANCE

(75) Inventors: Eric Papon, Saint Magne de Castillon; Jean-Jacques Villenave, Gradignan; Philippe Tordjeman, Saint Gely du Fesc, all of (FR)

(73) Assignee: Bostik Findley, Puteaux (FR)

(*) Notice: Subject to any disclaimer, the term of this patent is extended or adjusted under 35 U.S.C. 154(b) by 0 days.

(21) Appl. No.: 09/582,420

(22) PCT Filed: Dec. 2, 1998

(86) PCT No.: PCT/FR98/02588

§ 371 Date: Sep. 11, 2000

§ 102(e) Date: Sep. 11, 2000

(87) PCT Pub. No.: WO99/33896

PCT Pub. Date: Jul. 8, 1999

(30) Foreign Application Priority Data

Dec. 24, 1997 (FR) ............................................. 97 16532

(51) Int. Cl.⁷ ..................... C09J 175/08; C09J 175/14; C09J 7/00; B32B 27/40; B32B 33/00
(52) U.S. Cl. ........................... 528/28; 525/66; 525/474; 528/29; 528/32; 528/75; 528/905; 428/339; 428/343; 428/355 CN; 428/355 N
(58) Field of Search ..................... 525/66, 474; 528/28, 528/29, 75, 905, 32; 428/339, 343, 355 CN, 355 N

(56) References Cited

U.S. PATENT DOCUMENTS

| | | | |
|---|---|---|---|
| 3,925,582 A | 12/1975 | Sample, Jr. et al. | 427/385 |
| 4,456,718 A | 6/1984 | Brinkmann et al. | 524/114 |
| 4,764,553 A | * 8/1988 | Mosbach et al. | 524/591 |
| 5,739,245 A | * 4/1998 | Lubbers et al. | 528/28 |

FOREIGN PATENT DOCUMENTS

| | | | |
|---|---|---|---|
| EP | 269972 | * | 6/1988 |
| JP | 63-105085 | | 5/1988 |
| JP | 5-117352 | | 5/1993 |
| JP | 9-104749 | | 4/1997 |

* cited by examiner

*Primary Examiner*—Rabon Sergent
(74) *Attorney, Agent, or Firm*—Hunton & Williams

(57) ABSTRACT

The invention relates to polyurethane having improved shear strength which are obtained by polycondensation of a mixture of at least one polyol containing one or more polyether grafts and at least one short-chain alcohol with at least one diisocyanate. The invention also relates to the polyurethanes which are in the form of strips whose thickness is between 0.1 and 10 mm. The invention also relates to articles comprising the said polyurethanes.

11 Claims, No Drawings

POLYURETHANE ADHESIVE WITH HIGH SHEARING RESISTANCE

BACKGROUND OF THE INVENTION (i) Field of the Invention

The present invention relates to polyurethane adhesives having improved shear strength.

(ii) Description of the Related Art

Polyurethanes are polymers resulting from the polycondensation of polyisocyanates on polyols. They comprise a large number of compounds having widely varied properties. A feature common to polyurethanes is excellent tensile, tear and abrasion strength and stability with respect to chemical agents and temperature.

The Applicant Company has now found new polyurethane adhesives having improved shear strength. These polyurethanes are obtained by polycondensation reaction of diisocyanates on a mixture containing at least one polyol including polyether grafts and at least one short-chain alcohol.

Polyurethane adhesives containing grafted polymers are already known.

JP-B-01014021 describes a composition which is permeable to water vapour and consists of a hydrophobic polyurethane and a hydrophilic polyurethane. The hydrophilic polyurethane is obtained by reaction of a hydrophobic polyol, a diisocyanate and a chain extender having ethylenic unsaturations, followed by a step of copolymerization in the presence of ionic and nonionic hydrophilic monomers (for example polyoxyethylene).

JP-A-62020578 discloses an adhesive which consists of a mixture of a thermoplastic polyurethane having grafted vinyl units, a polyoxyalkylene ether polyol and an isocyanate.

GB-A-2197657 describes a mastic obtained by reaction of a grafted low molecular weight polymer, a polyol and a polyisocyanate.

JP-A-06172539 proposes a process for preparing thermoplastic polymers including polyoxyethylene grafts by polymerization of a polymer containing hydrophilic units with a halogenated hydrophobic rubber.

SUMMARY OF THE INVENTION

The polyurethane adhesives according to the present invention have high shear strength, in particular when two elements formed by the polyurethane of the invention are superimposed. The combination thus formed is found to have very high shear strength although it has substantially no cleavage strength. The polyurethanes of the invention furthermore have the following advantages:
- they are not tacky in nature,
- they can be transferred from one support to another at will (repositionable nature),
- they can be cleaned, for example with alcohols (reactivatable nature).

DETAILED DESCRIPTION OF PREFERRED EMBODIMENTS

In the present description, the term "polyurethanes having high shear strength" is intended to mean polyurethanes having a shear strength in excess of 1 daN (measured according to standard NFT76-107).

In view of the fact that it is not feasible to determine their structure precisely, the polyurethanes of the present invention will be defined by the process with which they are obtained. This process involves the polycondensation of a mixture containing at least one polyol including at least one polyether graft per chain and at least one short-chain alcohol on a diisocyanate. For the sake of clarity, the term "grafted polyol" will be used below to denote the polyol including at least one polyether graft per chain.

The grafted polyol involved in the formation of the polyurethane according to the invention may be any polyhydroxylated polymer whose main chain carries at least one graft of the formula:

$$-CHR_5-CH_2-\underset{\underset{R_2}{|}}{\overset{\overset{R_1}{|}}{Si}}-(CH_2)_x-[O-R_3]_y-O-R_4 \quad (I)$$

in which:

$R_1$ and $R_2$, which are identical or different, represent a straight-chain or branched $C_1-C_{10}$ alkyl radical, $R_3$ represents a straight-chain or branched $C_1-C_4$ alkylene radical, $R_4$ represents a straight-chain or branched $C_1-C_9$ alkyl radical, $R_5$ represents H or a methyl radical, x is a whole number between 1 and 11 inclusive, y is a whole number between 3 and 50.

The preferred grafted polyols are selected from hydroxytelechelic polybutadienes and hydroxytelechelic polyisoprenes.

They advantageously satisfy the formula:

$$HO-[CH_2-CR_6]_m-[CH_2-CR_6]_n-[CH_2-CR_7=CH-CH_2]_p-OH \quad (II)$$

with pendant groups:
$$\underset{CH_2}{\overset{CR_5}{\|}} \qquad \underset{CH_2}{\overset{CHR_5}{|}}$$
$$R_1-\underset{\underset{R_2}{|}}{\overset{|}{Si}}-(CH_2)_x-[O-R_3]_y-O-R_4$$

in which:

$R_1$ and $R_2$ represent a straight-chain or branched $C_1-C_{10}$ alkyl radical, $R_3$ represents a straight-chain or branched $C_1-C_4$ alkylene radical, $R_4$ represents a straight-chain or branched $C_1-C_9$ alkyl radical, $R_5$, $R_6$ and $R_7$, which are identical or different, represent H or a methyl radical, x is a whole number between 1 and 11 inclusive, y is a whole number between 3 and 50, m, n and p, which are identical or different, represent the average numbers of the various repeat units provided statistically, these numbers being connected with one another by the relationships:
(m+n+p) is between 30 and 100
p/(m+n+p) is between 0.2 and 0.8
n/(n+m) is between 0.1 and 1.

In the polyols of formula (II) it is to be understood that the repeat units having a pendant vinyl unsaturation may be identical or different, depending on the nature of $R_5$ and $R_6$. The same is true as regards the repeat units carrying the polyether graft.

Even more advantageously, the grafted polyols satisfy the aforementioned formula, in which $R_1$ and $R_2$ represent a methyl radical, $R_3$ represents an ethylene or propylene radical, $R_4$ represents a methyl or ethyl radical, $R_5$, $R_6$ and $R_7$ represent a hydrogen atom, x is a whole number between 4 and 11 inclusive, y is a whole number between 5 and 20, (m+n+p) is between 30 and 100 p/(m+n+p) is between 0.2 and 0.8 n/(n+m) is between 0.1 and 1.

The grafted polyols employed according to the invention can be prepared according to the process described below, this process consisting in:

a) reacting, in the presence of a hydrosilylation catalyst, apsolyol including ethylenic unsaturations with a haloalkyl (diorgano)silane of formula:

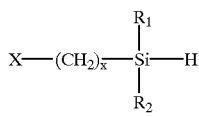
(III)

in which:

X represents Br or Cl, $R_1$, $R_2$ and x have the meaning given above, b) separating the polymer from the reaction medium, c) reacting the precipitated polymer with a polyether compound of formula:

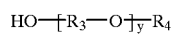
(IV)

in which $R_3$, $R_4$ and y have the meaning given above, in the presence of a compound which is capable of forming the alcoholate of the compound of formula (IV), and d) separating the resulting polymer from the reaction medium.

The starting polymer employed in step a) is generally selected from polyols containing ethylenic unsaturations of the pendant vinyl type and/or unsaturations carried by the carbon atoms constituting the chain of the polyol.

By way of example of polyols which can be used for the invention, mention may be made of the polyols obtained by polymerization or copolymerization of diene compounds in which a part contains hydroxyl groups such as hydroxylated polybutadienes or hydroxylated polyisoprenes.

The polyols are preferably selected from hydroxytelechelic polybutadienes containing pendant vinyl unsaturations, for example with -1,2 and -1,4 polymerizations, and hydroxytelechelic polyisoprenes containing pendant vinyl unsaturations, for example with -1,2, -3,4 and -1,4 polymerizations.

The halogenated silane of formula (III) is capable of reacting with the ethylenic and pendant vinyl unsaturations carried by the initial polyol when the temperature exceeds 40° C. Under the preferred process conditions, that is to say at a temperature of less than 80° C., only the pendant vinyl unsaturations react, partly or completely, and the ethylenic unsaturations do not react substantially with the halogenated silane (III).

The preferred halogenated silane satisfies the formula (III) in which:

X represents Br, $R_1$ and $R_2$ represent a methyl radical, x is a whole number between 4 and 11.

In general, the amount of halogenated silane (III) employed depends on the number of pendant vinyl unsaturations on which it is to be added. The procedure is advantageously carried out in the presence of an excess of between 5 and 60% by mole with respect to the stoichiometric amount needed to convert the desired number of vinyl bonds.

The hydrosilylation catalyst is generally selected from platinum-based catalysts such as hexachloroplatinic acid, optionally in hydrated form, metal carbonyls such as cobalt carbonyl or nickel carbonyl. Hexachloroplatinic acid is preferably used.

The catalyst is generally employed in an amount of 0.1 to 0.5% by mole with respect to the halogenated silane of formula (III).

The hydrosilylation reaction in step a) can be carried out either in a heterogeneous medium, that is to say without a solvent, or in a homogeneous medium in a solvent or mixture of solvents common to the starting polymer and the halogenated silane (III). Use is preferably made of tetrahydrofuran, toluene, hexane, methylene chloride or dimethylformamide.

The silanes of formula (III) can be obtained by known processes, for example by reaction of a ω halogenated alkene of formula:

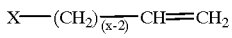

in which X and x have the meaning given above, and a chlorosilane of formula:

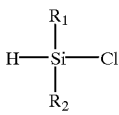

in which $R_1$ and $R_2$ have the meaning given above, to form the following chlorosilane:

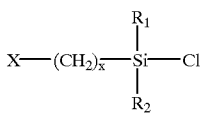

The reaction is carried out in the presence of a hydrosilylation catalyst, for example hexachloroplatinic acid. The chlorosilane which is obtained is reduced in the presence of a reduction catalyst, for example LiAlH$_4$, to form the silane of formula (III).

In step b), the polymer may be separated by centrifuging, precipitation, preparative steric exclusion chromatography or any other method which is known per se. It is preferable to use precipitation with a compound or a mixture of compounds not capable of dissolving the polyol, for example methanol, ethanol, acetone or an acetone/ethanol mixture.

In step c), use is preferably made of a polyether compound of formula (IV) in which:
- $R_3$ represents an ethylene or propylene radical,
- $R_4$ represents a methyl or ethyl radical,
- y is a whole number between 3 and 50, advantageously between 5 and 20.

The compound which is capable of forming the alcoholate of the compound of formula (IV) is generally selected from the group consisting of the alkali metals, for example Na or Li, the salts of alkali metals, for example $Cs_2CO_3$ or $K_2CO_3$, and the quaternary ammonium salts, for example tetrabutylammonium bromide.

In general, the amount of polyether compound (IV) corresponds to the stoichiometric amount needed to react with the halogenated silane residues contained in the polyol. The desired stoichiometric amount is advantageously increased by an excess of 5 to 20% by mole.

The amount of compound which is capable of forming the alcoholate of the compound of formula (IV) depends on the chemical nature. With an alkali metal, use is generally made of a stoichiometric amount with respect to the compound of formula (IV). Use is generally made of an amount of salts of alkali metals or quarternary ammonium salts varying from 20% to 100% by mole of the compound of formula (IV).

The reaction in step c) is carried out in an aprotic polar solvent, the amount of which is adjusted so as to obtain a concentration of between 0.5 and 3 moles of polymer per litre of solvent, preferably of the order of 1 mole of polymer per litre of solvent.

This reaction is carried out with vigorous stirring, in excess of 100 rpm, and at a temperature which may vary from 40 to 90° C., preferably of the order of 80° C.

In step d), the grafted polyol can be separated from the reaction medium using the methods defined in step b) above.

The grafted polyols obtained in this way are used to form the polyurethane having high shear strength according to the invention. The latter is obtained by polycondensation of a mixture containing at least one grafted polyol and at least one short-chain alcohol, with at least one diisocyanate.

The grafted polyols can be used alone or in mixture with one or more other compatible ungrafted polyols, for example hydroxytelechelic polybutadiene.

The short-chain alcohol is selected from the group consisting of diols and triols containing 1 to 10 carbon atoms, and mixtures thereof. By way of example, mention may be made of ethanediol, 1,2-propanediol, 1,3-propanediol, 1,4-butanediol, 1,6-hexanediol, trimethylolpropane, glycerol, 1,2,6-hexanetriol, triethanolamine and triisopropanolamine. 1,4-Butanediol, triisopropanolamine or mixtures thereof are preferably selected.

In general, the amount of grafted polyol is such that the ratio of the number of OH equivalents provided by the grafted polyol to the total number of OH equivalents provided by the grafted polyol, the ungrafted polyol and the short-chain alcohol is between 0.03 and 0.065.

Similarly, the amount of grafted and ungrafted polyols is such that the ratio of the number of OH equivalents provided by the grafted and ungrafted polyols to the total number of OH equivalents provided by the grafted polyol, the ungrafted polyol and the short-chain alcohol is between 0.03 and 0.07.

The diisocyanate involved in forming the polyurethane according to the invention is selected from aliphatic, cycloaliphatic or aromatic diisocyanates, as well as mixtures of these compounds.

By way of examples of aliphatic diisocyanates, mention may be made of hexamethylene diisocyanate (HMDI), ethylene diisocyanate, ethylidene diisocyanate, propylene diisocyanate, butylene diisocyanate, dichlorohexamethylene diisocyanate, furfurylidene diisocyanate and mixtures of these compounds.

By way of examples of cycloaliphatic diisocyanates, mentioned may be made of isophorone diisocyanate (IPDI), cyclopentylene 1,3-diisocyanate, cyclohexylene 1,4-diisocyanate, cyclohexylene 1,2-diisocyanate and mixtures of these compounds.

By way of examples of aromatic diisocyanates, mention may be made of diphenylmethane diisocyanate, in particular 4,4'-diphenylmethane diisocyanate (MDI), 2,4'-diphenylmethane diisocyanate and 2,2'-diphenylmethane diisocyanate, toluene diisocyanate, in particular 2,4-toluene diisocyanate (TDI) and 2,6-toluene diisocyanate, 2,2-diphenylpropane 4,4'-diisocyanate, p-phenylene diisocyanate, m-phenylene diisocyanate, xylene diisocyanate, 1,4-naphthalene diisocyanate, 1,5-naphthylene diisocyanate, azobenzene 4,4'-diisocyanate, diphenylsulphone 4,4'-diisocyanate, 1-chlorobenzene 2,4-diisocyanate, and mixtures of these compounds.

Use is preferably made of MDI, 2,4'-diphenylmethane diisocyanate, 2,2'-diphenylmethane diisocyanate, TDI, 2,6-toluene diisocyanate, HMDI and IPDI.

The polycondensation reaction of the grafted polyol on the diisocyanate is known per se.

Conventionally, it consists in reacting the mixture comprising at least one grafted polyol according to the invention, if appropriate one or more compatible ungrafted polyols, and at least one short-chain alcohol, with the diisocyanate in the presence of a polymerization catalyst known to the person skilled in the art, for example dibutyltin dilaurate. The reaction is generally carried out at a temperature of between 40 and 90° C., preferably 50 and 70° C. The reagents are generally employed in amounts such that the ratio NCO/OH is between 0.8 and 1, preferably 0.95 and 1.

The polyurethanes according to the invention may furthermore contain:
- plasticizers such as oils or phthalates,
- resins,
- waxes such as monocristalline waxes or polyethylene waxes,
- stabilizers such as antioxidants and anti-UV agents,
- fillers, for example carbon black, $TiO_2$, $BaSO_4$, $CaCO_3$ or triacetin,
- compatible polymers, for example polybutadiene or polyisoprene, and incompatible polymers, for example polyethylene, polypropylene, copolymers of ethylene and vinyl acetate (EVA) or copolymers of ethylene and butyl acrylate (EBA),
- diluent capable of slowing the gelling of the polyurethane.

The polyurethanes according to the invention can be used in numerous applications.

For example, they can be employed as assembly adhesives, in particular for butt-connecting polyvinyl chloride (PVC) tubes, or for fixing various types of supports in a vertical position (supports made of glass, metal such as aluminium, or plastic such as PVC, polyethylene terephthalate (PET), polytetrafluoro-ethylene (PTFE) and copolymers of ethylene and vinyl acetate (EVA)) in such widely varied fields as the office, motor vehicles or aeronautics (interior furniture).

Because of their high shear strength and very limited cleavage strength, the polyurethanes are advantageously used as a non-slip coating for surfaces used for sport and/or wet surfaces.

The polyurethanes according to the invention are advantageously in the form of "ready-to-use" strips whose dimensions can vary in a broad range. Their thickness is preferably between 0.1 and 10 mm, and advantageously between 0.1 and 5 mm.

The following examples serve to illustrate the invention. In these examples, the physico-chemical properties of the grafted polyols and the mechanical properties of the polyurethanes are measured according to the following methods.

The glass transition temperature (Tg) is measured by differential enthalpy analysis (Mettler TA3000 instrument).

The molecular mass of the grafted polyol is measured by steric exclusion chromatography (column: TSK-HXL; eluent: tetrahydrofuran; detection: U.V. and differential refractometry; calibration: polystyrene).

The average graft proportion is calculated by $^1$H NMR at 250 MHz (Bruker instrument).

The shear strength is measured according to the standard NFT 76-107 and expressed in daN (MTS-DY30 dynamometer).

The peel strength is measured according to the standard NFT 76-112.

The surface energies are measured on 0.2 mm thick films obtained by depositing polyurethane on a polytetrafluoroethylene sheet, and gelling. The contact angle with water ($\theta_{water}$) is measured using a goniometer (Krüss instrument) and is expressed in degrees. The thermodynamic adhesion work ($W_{adh}$) is calculated using the mathematical construction of F. M. FOWKES [Ind. and Eng. Chem., vol. 56, p. 12, (1964)]. $W_{adh}$ is expressed in mJ/m$^2$.

EXAMPLE 1

1—Preparation of grafted hydroxytelechelic polybutadiene

A polyol of formula:

$$HO-[CH_2-CH(CH=CH_2)]_6-[CH_2-CH(CH_2-CH_2-Si(CH_3)(CH_3)-(CH_2)_4-[O-CH_2-CH_2]_{14}-O-CH_3)]_4-[CH_2-CH=CH-CH_2]_{44}-OH$$

is prepared from a hydroxytelechelic polybutadiene containing 20% unsaturations of the pendant vinyl type, on which groups derived from polyoxyethylene monomethyl ether are grafted by means of (4-bromo-1-butyl)-dimethylsilane.

Step (a)

The following are introduced into a 250 ml reactor, emersed in a thermostatic oil bath equipped with a refrigerator and a stirring device:

5 g (0.0178 mol) of hydroxytelechelic polybutadiene (Poly Bd® R 45 HT; ELF ATOCHEM) of formula:

$$HO-[CH_2-CH(CH=CH_2)]_{10}-[CH_2-CH=CH-CH_2]_{44}-OH$$

having a molecular mass of 2800, a viscosity of 5000 mPa.s at 30° C. and a hydroxyl index of 0.83, 1.46 g (7.5×10$^{-3}$ mol) of (4-bromo-1-butyl) dimethylsilane, and 100 ml of anhydrous toluene.

The mixture is stirred to obtain a homogeneous solution and is heated to 60° C., then 0.001 g (3.7×10$^{-4}$ g of elementary platinum) of hexachloroplatinic acid hexahydrate is added, the procedure being carried out under nitrogen.

The reaction mixture is kept for 10 hours at 60° C., then is cooled to room temperature. The mixture is poured into 500 ml of ethanol in order to precipitate the resulting precursor polyol. The latter is separated by pouring off and dried. Its molecular mass is about 3500.

The degree of modification of the double bonds of the starting polybutadiene is monitored by $^1$H NMR. It is observed that 40% of the pendant vinyl unsaturations were modified, while the non-vinyl (diene) unsaturations were not saturated.

Step (b)

The following are introduced into a reactor such as the one used in step (a):

5 g (0.0178 mol) of the precursor polyol obtained in step (a) in solution in 200 ml of anhydrous toluene, 0.17 g (0.0075 mol) of Na, 5.62 g (0.0075 mol) of polyoxyethylene monomethyl ether having a molecular mass of 750 (reference: 19232.5000; ACROS CHEMICAL).

The reaction mixture, under vigorous stirring, is heated to a temperature of 80° C. This combination is kept under these conditions for 12 hours.

At the end of the reaction, the reaction mixture is filtered. The organic phase is recovered, concentrated and poured into 500 ml of ethanol. The precipitated grafted polymer is recovered by filtration and vacuum dried at 50° C. for 72 hours.

The grafted polyol has the following characteristics:

Tg: −50° C.

endothermic peak at 25° C. corresponding to fusion of the grafts molecular mass: about 5900 average number of grafts: 4

2—Preparation of the polyurethane

In a flask placed on a rotary sleeve with an inlet and outlet for circulating nitrogen and evacuation, the following (in parts by weight) are introduced:

| | |
|---|---|
| hydroxytelechelic polybutadiene (poly Bd ® R 45 HT; ELF ATOCHEM) | 3 |
| 1,4-butanediol | 2 |
| triisopropanolamine | 1.3 |
| grafted hydroxytelechelic polybutadiene from step 1 (b) | 6.1 |
| dibutyltin dilaurate | 0.01 |

The reaction mixture is heated to 60° C. and placed under vacuum for 2 hours. 5.9 parts by weight of toluene diisocyanate are introduced while ensuring that the mixture is homogenized properly. The mixture is then kept under vacuum at 60° C. for 15 minutes and at 60° C. for 72 hours.

The polyurethane which is obtained has the following characteristics:

zero peel strength interfacial failure $\theta_{water}$=58.2°

$W_{adh}$=111 mJ/m$^2$

The values of the shear strength as a function of the time and of the contacting pressure are given in Table 1.

EXAMPLE 2

The procedure described in Example 1 was carried out, with the difference that, in step 2, 0 parts by weight of hydroxytelechelic polybutadiene and 11.8 parts by weight of grafted hydroxytelechelic polybutadiene are used.

The polyurethane which is obtained has the following characteristics:

zero peel strength interfacial failure $\theta_{water}$=46.2°

$W_{adh}$=123 mJ/m$^2$

The values of the shear strength as a function of the time and of the contacting pressure are given in Table 1.

EXAMPLE 3

The grafted hydroxytelechelic polybutadiene of the following formula is prepared:

$$HO\text{---}\left[CH_2\text{---}\underset{\underset{CH_2}{\overset{\|}{CH}}}{CH}\right]_6\left[CH_2\text{---}\underset{\underset{\underset{Si\text{---}(CH_2)\text{---}[O\text{---}CH_2\text{---}CH_2]_7\text{---}O\text{---}CH_3}{|}}{CH_2}}{CH}\right]_4[CH_2\text{---}CH\text{=}CH\text{---}CH_2]_{44}\text{---}OH$$

under the conditions described in Example 1, with the difference that:

in step 1 b), use is made of the polyoxyethylene monomethyl ether having a molecular mass of 350 (reference: 19230.500; ACROS CHEMICAL).

The grafted polyol which is obtained has the following characteristics:

Tg: −60° C.

endothermic peak at 15° C. corresponding to the fusion of the grafts molecular mass: about 4700 average number of grafts: 4 in step 2, use is made of 3 parts by weight of hydroxytelechelic polybutadiene and 4.5 parts by weight of grafted hydroxytelechelic polybutadiene from step 1 b).

The polyurethane which is obtained has the following characteristics:

zero peel strength interfacial failure $\theta_{water}$=58.2°

$W_{adh}$111 mJ/m$^2$

The values of the shear strength as a function of the time and of the contacting pressure are given in Table 1.

EXAMPLE 4 (COMPARATIVE)

The following (in parts by weight) are introduced into the reactor described in Example 1, step 2:

| | |
|---|---|
| hydroxytelechelic polybutadiene (poly Bd ® R 45 HT; ELF ATOCHEM) | 5.6 |
| 1,4-butanediol | 2 |
| triisopropanolamine | 1.3 |
| dibutyltin dilaurate | 0.01 |
| toluene diisocyanate | 5.9 | following characteristics:

zero peel force interfacial failure $\theta_{water}$=61.5°

$W_{adh}$107 mJ/m$^2$

The values of the shear strength-as a function of the time and of the contacting pressure are given in Table 1.

TABLE 1

| EXAMPLE | CONTACTING PRESSURE (MPa) | CONTACT TIME (H$^{1/4}$) | SHEAR STRENGTH (daN) |
|---|---|---|---|
| 1 | 0.0005 | 0.8 | 2.0 |
|   | 0.0005 | 2.0 | 3.5 |
|   | 0.0005 | 2.6 | 4.2 |
|   | 0.5 | 0.8 | 25 |
| 2 | 0.0005 | 0.8 | 2.5 |
|   | 0.0005 | 2.0 | 4.0 |
|   | 0.0005 | 2.6 | 4.4 |
| 3 | 0.0005 | 0.8 | 0.2 |
|   | 0.0005 | 1.5 | 1.0 |
|   | 0.0005 | 2.0 | 1.8 |
|   | 0.0005 | 2.6 | 3.0 |
| 4 (comparative) | 0.0005 | 0.6 | 0.3 |
|   | 0.0005 | 0.8 | 0.4 |
|   | 0.0005 | 2.0 | 1.0 |
|   | 0.5 | 0.8 | 10.1 |

An increase in the shear strength is observed when the number of grafts per chain increases, which is unexpected for grafts of such small size (see Examples 1, 2 and 4).

Furthermore, it is noted that increasing the molecular mass of the grafts, at constant graft proportion, leads to an increase in the shear strength (see examples 1, 3 and 4).

It is also observed that the influence of the grafts is more significant when the contacting pressure is high (see Examples 1 and 4).

What is claimed is:

1. A polyurethane adhesive obtained by polycondensation of (1) a mixture comprising at least one polyol including one polyether graft per chain and at least one short-chain alcohol with (2) at least one diisocyanate;

wherein the graft satisfies the formula:

$$\text{---}CHR_5\text{---}CH_2\text{---}\underset{\underset{R_2}{|}}{\overset{\overset{R_1}{|}}{Si}}\text{---}(CH_2)_x\text{---}[O\text{---}R_3]_y\text{---}O\text{---}R_4 \qquad (I)$$

in which:

$R_1$ and $R_2$, which are identical or different, represent a straight-chain or branched $C_1$–$C_{10}$ allyl radical, $R_3$ represents a straight-chain or branched $C_1$–$C_4$ alkyl radical, $R_4$ represents a straight-chain or branched $C_1$–$C_9$ alkyl radical, $R_5$ represents H or a methyl radical, x is a whole number between 1 and 11 inclusive,
y is a whole number between 3 and 50.

2. The adhesive according to claim 1, in which the polyol is a hydroxytelechelic polybutadiene or a hydroxytelechelic polyisoprene.

3. The adhesive according to claim 1, in which the polyol satisfies the formula:

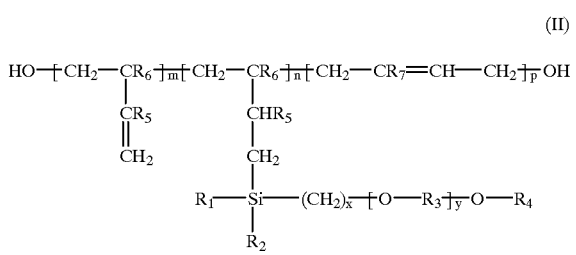

(II)

in which:

R$_1$ and R$_2$ represent a straight-chain or branched C$_1$–C$_{10}$ alkyl radical, R$_3$ represents a straight-chain or branched C$_1$–C$_4$ alkylene radical, R$_4$ represents a straight-chain or branched C$_1$–C$_9$ alkyl radical, R$_5$, R$_6$ and R$_7$, which are identical or different, represent H or a methyl radical, x is a whole number between 1 and 11 inclusive, y is a whole number between 3 and 50, m, n and p, which are identical or different, represent the average numbers of the various repeated units provided statistically, these numbers being connected with one another by the relationships:

(m+n+p) is between 30 and 100 p/(m+n+p) is between 0.2 and 0.8 n/(n+m) is between 0.1 and 1.

4. The adhesive according to claim 3, in which

R$_1$ and R$_2$ represent a methyl radical,

R$_3$ represents an ethylene or propylene radical,

R$_4$ represents a methyl or ethyl radical,

R$_5$, R$_6$ and R$_7$ represent a hydrogen atom, x is a whole number between 4 and 11 inclusive, y is a whole number between 5 and 20, (m+n+p) is between 30 and 100 p/(m+n+p) is between 0.2 and 0.8 n/(n=m) is between 0.1 and 1.

5. The adhesive according to claim 1, in which the short-chain alcohol is a diol or a triol comprising 1 to 10 carbon atoms, or mixues thereof.

6. The adhesive according to claim 5, in which the diol is ethanediol, 1,2-propanediol, 1,3-propanediol, 1,4-butanediol, or 1,6-hexanediol, and the triol is trimethylolpropane, glycerol, 1,2,6-hexanetriol, triethanolamine or triisopropanolamine.

7. The adhesive according to claim 1, in which the diisocyanate is an aliphatic, cycloaliphatic or aromatic diisocyanate, or mixtures thereof.

8. The adhesive according to claim 7, in which the diisocyanate is MDI, 2,4'-diphenylmethane diisocyanate, 2,2'-diphenylmethane diisocyanate, TDI, 2,6-toluene diisocyanate, HMDI or IPDI.

9. A strip comprising the adhesive according to claim 1.

10. The strip according to claim 9, having a thickness between 0.1 and 10 mm.

11. An article comprising the polyurethane adhesive according to claim 1.

* * * * *